M. HACKER.
TOOL HOLDER.
APPLICATION FILED JUNE 21, 1918.

1,298,201.

Patented Mar. 25, 1919.

WITNESS:
René Bruine

INVENTOR
Max Hacker
By Attorneys,

UNITED STATES PATENT OFFICE.

MAX HACKER, OF BROOKLYN, NEW YORK.

TOOL-HOLDER.

1,298,201.  Specification of Letters Patent.  Patented Mar. 25, 1919.

Application filed June 21, 1918. Serial No. 241,126.

*To all whom it may concern:*

Be it known that I, MAX HACKER, a citizen of the United States of America, residing in the borough of Brooklyn, county of Kings, city and State of New York, have invented certain new and useful Improvements in Tool-Holders, of which the following is a specification.

This invention relates to tool holders and aims to provide improvements therein.

The present invention provides a tool holder having the functions of at least six (6) tool holders of ordinary construction.

The invention further provides a tool holder which may be readily used, with good results, compared with present tool holders, as regards breakage of cutters and character of work, by inexperienced machinists.

The invention further provides a tool holder which is of simple and durable construction, and which may be readily made and used.

An embodiment of the invention is illustrated in the accompanying drawings wherein—

Figure 1:
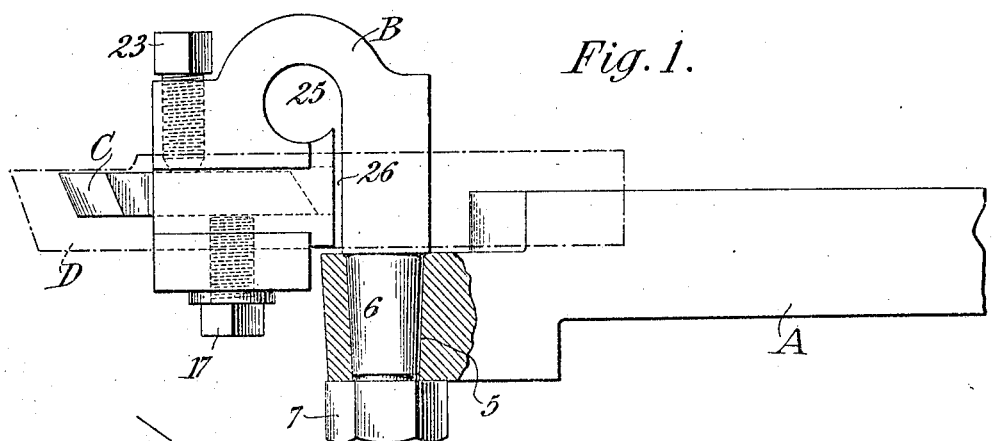
Figure 1 is a side elevation, partly in section, of said embodiment.
Figure 2:
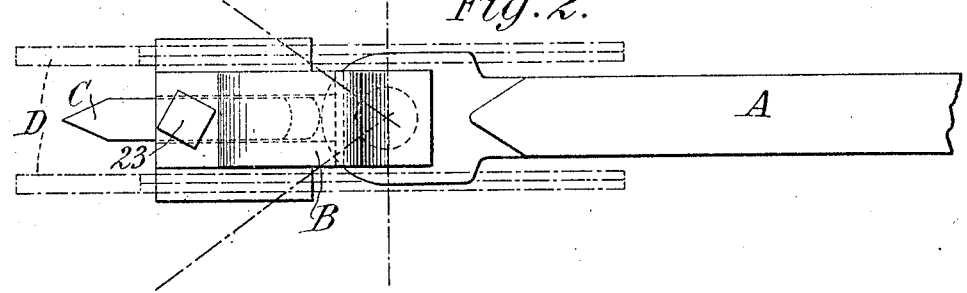
Fig. 2 is a top plan view.
Figure 3:
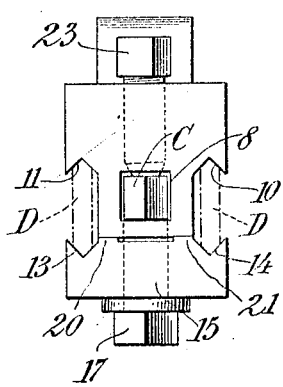
Fig. 3 is a front elevation.

In said drawings, A designated the shank and B the head of the tool holder.

The head B is pivotally connected to the shank, and to this end the shank is provided with a tapered bore 5, and the head is provided with a tapered shank 6 adapted to fit within said bore 5. The head B is held in a fixed position upon the shank A by means of a nut 7 upon the threaded end of the shank 6.

The head B, including the shank 6, is preferably formed of a single piece of metal. The head B is provided with an approximately central tool or bit recess 8 adapted to receive a tool or bit C, and at each side with shoulders 10 and 11 (preferably V-shaped in cross-section) adapted to form in conjunction with similar shoulders 13 and 14 upon a plate 15, tool or bit-holding recesses on each side of the head B, in which cutters D may be held. The plate 15 is connected to the head B by a screw 17, and the turning of said screw 17 acts to bring the shoulders 11 and 13, 10 and 14 to or away from one another, in order to clamp a tool D upon one side or the other of the head B, the plate 15 fulcruming on the head B at points 20 or 21.

A screw 23 acts to fasten the cutter C in the recess 8.

The head is constructed to yield or spring in case of abnormal strain upon one of the tools or bits, and to this end, it is conveniently formed with a hole 25 drilled therein from side to side, and with a saw kerf 26 running from its lower side into said hole 25.

Operation: The cutter C may be of any form, as for example a thread cutter, or a finishing cutter, and may be fastened in place in the recess 8 of the head B, by means of the screw 23. When the head is fastened to the shank A so that it is in line with the shank A, the tool functions as an ordinary straight tool holder. By turning the head B in the bore 5 to either the right or left, it may function as a right-hand or left-hand offset tool holder, convenient in working close to the head or tail stock, or to shoulders upon the work.

By inserting a cutting-off cutter D in either of the recesses at each side of the head B, and arranging the head so that its center line is in line with the shank A, the tool holder functions as either a right or left-side cutting-off tool. By turning the head B in the bore 5 to either the right or left, the tool functions as either a right-hand or left-hand offset cutting-off tool. The head B is capable of turning to a position at right angles to the stock A, to either the right or left. This is of importance in handling work of large diameter, as, by placing the shank A in the tool post parallel to the axis of the lathe and turning the head to a position at right angles to the shank it is possible to do cutting on work of a larger diameter than could be cut with a tool holder otherwise formed and fixed in position in the tool post. The cutting off tools D as well as the variety of tool which may be used in the center recess 8 may be used in the tool holder in the manner just described.

The head yields with either of the several styles of cutters, under abnormal strain, and this is a valuable feature of the tool, inasmuch as in the hands of inexperienced machinists a very excessive breakage of tools or bits is avoided. The ability to spring has been found particularly useful with cutting-off tools upon tubes, especially where the tubes are of considerable diameter and length, and are not perfectly round, in the sense of having "high spots" therein, as is ordinarily the case.

The inventive ideas may receive other mechanical expressions than herein specifically illustrated and described, within the scope of the appended claims.

What is claimed is:—

1. A tool holder comprising a head and shank, said head and shank being pivotally connected, said head having tool recesses on two sides thereof and adapted to hold a tool in either of said recesses on either side of the holder, and a tool recess in the approximate center line thereof, said head having a springable portion permitting the tool held thereby to recede under excessive strain.

2. A tool holder comprising a head having shoulders on two sides thereof, and a clamping plate secured to the bottom of the head and having shoulders forming with the shoulders on the head a plurality of tool-holding recesses adapted to hold a tool on either side of the holder, said head having a third tool-holding recess in the approximate center line thereof, said head having a springable portion permitting the tool held thereby to recede under excessive strain.

In witness whereof, I have hereunto signed my name.

MAX HACKER.

Copies of this patent may be obtained for five cents each, by addressing the "Commissioner of Patents, Washington, D. C."